UNITED STATES PATENT OFFICE.

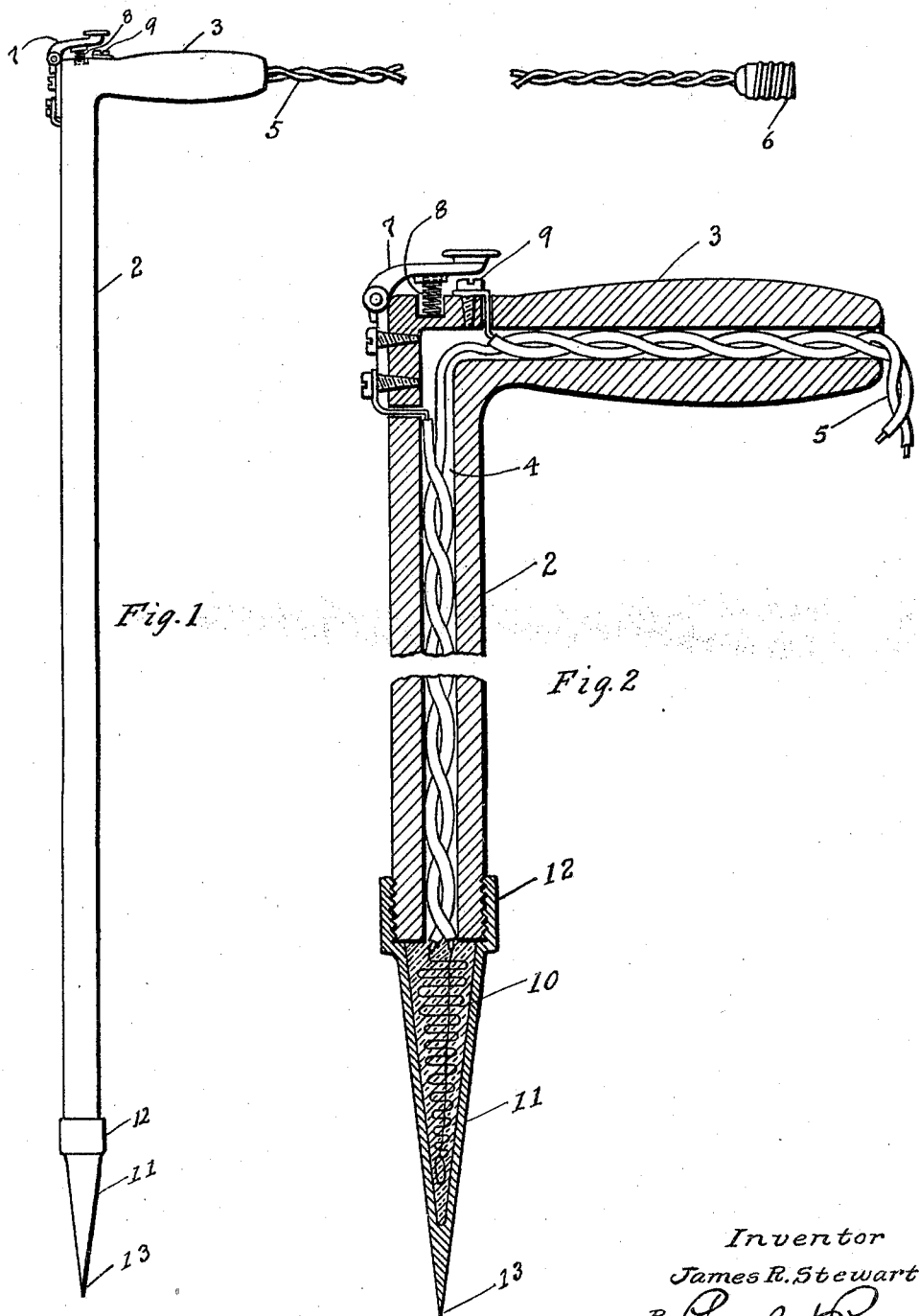

JAMES R. STEWART, OF MINNEAPOLIS, MINNESOTA.

WEED-KILLER.

1,399,529. Specification of Letters Patent. Patented Dec. 6, 1921.

Application filed June 19, 1919, Serial No. 305,341. Renewed September 23, 1921. Serial No. 502,690.

*To all whom it may concern:*

Be it known that I, JAMES R. STEWART, a citizen of the United States, resident of Minneapolis, county of Hennepin, State of Minnesota, have invented certain new and useful Improvements in Weed-Killers, of which the following is a specification.

The object of my invention is to provide a device by means of which dandelion and other noxious weeds growing in the lawns of residence districts and in parks may be easily and quickly destroyed through the application of heat directly to the crown of the root. Generally these weeds are dug out with a knife or tool or destroyed by the application of an acid or a liquid like kerosene or gasolene, but it is practically impossible to remove all of the root of a dandelion with a knife or other tool and it immediately grows again, and the use of gasolene, kerosene, or an acid results in dripping more or less of it upon the lawn and killing the grass as well as the weeds. With my invention the application of the intense heat is direct upon the crown of the weed root and it is immediately killed.

The invention consists generally in various constructions and combinations, all as hereinafter described and particularly pointed out in the claims.

In the accompanying drawings forming part of this specification,

Figure 1 is a side view of a weed killing tool embodying my invention,

Fig. 2 is a longitudinal sectional view of the same.

In the drawing, 2 represents the shank of the tool, which may be of wood or any other suitable material, and is preferably about the length of a cane and terminates in a suitable hand grip 3. This hand grip and the shank have a passage 4 extending therethrough in which is inserted the flexible cord 5 that is provided with a plug 6 for application to the socket of an electric fixture or to the baseboard electric outlet in a residence or building where it is desired to make the connection. This cord is of suitable length to allow the tool to be carried as far from the building as desired to reach the entire area of the lawn. A switch 7 is mounted on the shank 2 and is normally open through the tension of a spring 8, the switch being in position to be closed by the pressure of the thumb or finger of the user of the tool for moving the circuit closing element of the switch into contact with the surface 9. When contact is here made, the circuit is closed through a flexible cord and a current is conducted to the heating coil 10 on which the end of the flexible cord is mounted. This heating coil is preferably tapered in form and fits within a hollow tapered tip 11, of any suitable material which will become sufficiently heated by its proximity to the heating coil to absolutely destroy any plant life which may come in contact with the outer surface of the tip.

The end of the tip has an internally threaded flange 12 thereon to receive the end of the shank 2. The tip terminates in a sharpened point 13 and in using the device this point is thrust into the ground so that the crown of the weed root is in contact with the metal surface of the point. The circuit is then closed through the switch and the heating of the point will immediately destroy all life in the root. The device may be moved from place to place on the lawn and the heating point applied to the dandelion or other weed root without the necessity of stooping.

The device may be made in various weights and its size may be modified and the intensity of the current varied to adapt it for the use for which it is intended.

I claim as my invention:

1. A weed destroying tool comprising a shank having a handle at one end and provided with an electric conductor and a circuit breaker therefor, a hollow metallic tip mounted on said shank and provided with a long tapering point adapted to be inserted into the ground, and a heating coil mounted in said hollow tip and connected with said conductor.

2. A weed destroying tool comprising a shank having a horizontal hand grip at one end, electric conductors mounted in said shank, a switch device mounted on said shank adjacent said handle and adapted to be operated by the thumb of the user, a hollow metallic tip mounted on the end of said shank and having a long tapering point for insertion into the ground and a heating coil mounted in said tip and connected with said conductors.

3. A weed destroying tool comprising a shank provided with an electric conductor, a hollow metallic tip mounted on one end of said shank and provided with a long tapering point adapted to be inserted into the ground, a heating coil mounted in said hollow tip and connected with said conductor and said shank having a hand grip and being of sufficient length to allow said tapering point to be thrust into the soil with the user in a substantially upright position.

In witness whereof, I have hereunto set my hand this 10th day of June, 1919.

JAMES R. STEWART.